US012791932B2

(12) United States Patent
Wang

(10) Patent No.: US 12,791,932 B2
(45) Date of Patent: Nov. 10, 2026

(54) QUADRUPED ROBOT HAVING ULTRA-WIDE VIEWING ANGLE

(71) Applicant: HangZhou YuShu TECHNOLOGY CO., LTD., Hangzhou City (CN)

(72) Inventor: Xingxing Wang, Hangzhou City (CN)

(73) Assignee: HANGZHOU YUSHU TECHNOLOGY CO., LTD., Hangzhou (CN)

( * ) Notice: Subject to any disclaimer, the term of this patent is extended or adjusted under 35 U.S.C. 154(b) by 674 days.

(21) Appl. No.: 18/019,008

(22) PCT Filed: Oct. 25, 2021

(86) PCT No.: PCT/CN2021/126088

§ 371 (c)(1),
(2) Date: Jan. 31, 2023

(87) PCT Pub. No.: WO2022/042775

PCT Pub. Date: Mar. 3, 2022

(65) Prior Publication Data

US 2023/0288680 A1 Sep. 14, 2023

(30) Foreign Application Priority Data

Aug. 25, 2020 (CN) ......................... 202021803883.7

(51) Int. Cl.
*G03B 30/00* (2021.01)
*G02B 7/00* (2021.01)
(Continued)

(52) U.S. Cl.
CPC ............... *G03B 30/00* (2021.01); *G02B 7/00* (2013.01); *G02B 13/06* (2013.01); *B62D 57/032* (2013.01); *H04N 23/55* (2023.01)

(58) Field of Classification Search
USPC .......................................................... 359/809
See application file for complete search history.

(56) References Cited

U.S. PATENT DOCUMENTS

2023/0176157 A1* 6/2023 Wang ........................ G01S 3/40
342/147

FOREIGN PATENT DOCUMENTS

CN 105216902 A 1/2016
CN 205059786 U 3/2016
(Continued)

*Primary Examiner* — Dung T Nguyen
(74) *Attorney, Agent, or Firm* — MUNCY, GEISSLER, OLDS & LOWE, P.C.

(57) ABSTRACT

Disclosed is a quadruped robot having an ultra-wide viewing angle. The quadruped robot is equipped with a wide-angle lens or a fisheye lens (2) having a viewing angle that covers a blind area (100) under the robot abdomen, and thus is capable of sensing the terrain under the robot abdomen and obstacles around the robot, achieving ultra-wide vision, and effectively reducing visual blind areas of the quadruped robot. Therefore, the solution can help the robot to select footholds for feet to prevent the feet from slipping or stepping into pits or holes, or can be used for preventing the feet from hitting obstacles while swinging or for preventing the robot from hitting obstacles around the robot during movement. Thus, the solution prevents loss of control and damage of the quadruped robot, improves the motion sensing capability, and effectively satisfies the requirements for autonomous movement and obstacle avoidance of quadruped robots.

18 Claims, 5 Drawing Sheets

(51) Int. Cl.

| | |
|---|---|
| ***G02B 13/06*** | (2006.01) |
| *B62D 57/032* | (2006.01) |
| *H04N 23/55* | (2023.01) |

(56) References Cited

FOREIGN PATENT DOCUMENTS

| | | | |
|---|---|---|---|
| CN | 106526613 | A | 3/2017 |
| CN | 206984162 | U | 2/2018 |
| CN | 111301556 | A | 6/2020 |
| CN | 212980385 | U | 4/2021 |
| CN | 213502637 | U | 6/2021 |
| JP | 2009-6984 | A | 1/2009 |

* cited by examiner

QUADRUPED ROBOT HAVING ULTRA-WIDE VIEWING ANGLE

TECHNICAL FIELD

The present invention relates to a quadruped robot having an ultra-wide viewing angle, pertaining to the technical field of quadruped robots.

BACKGROUND

Currently, with the rapid development of quadruped robot technology, quadruped robots are applied in an increasingly wide range. The autonomous movement and obstacle avoidance functions of quadruped robots are important indicators of the intelligence thereof.

However, in order to sense obstacles and terrain around the robot, a combination of several depth cameras is usually mounted around the existing quadruped robot to sense the surrounding environment of the robot. In this case, a relatively large number of depth cameras are required to satisfy the requirements of sensing the surrounding environment of the robot. The provision of excessive depth cameras leads to a larger robot body size and a higher production cost of the entire robot and increases the difficulty in designing the overall structure of the robot body.

The Chinese patent (Publication No. CN106526613A) discloses a large-area anti-collision mechanism for robots, including a robot walk and brake control module, an infrared ranging electronic module, an infrared transmitting tube, and an infrared receiving sensor. The infrared ranging electronic module is connected to the robot walk and brake control module. The infrared transmitting tube and the infrared receiving sensor are separately connected to the infrared ranging electronic module. A transmitting direction of the infrared transmitting tube and a receiving direction of the infrared receiving sensor are provided in the same direction and parallel to each other. The present invention further includes a wide-angle lens. The imaging surface of the wide-angle lens is provided on the effective focal plane of the infrared transmitting tube and the infrared receiving sensor. The infrared transmitting tube and the infrared receiving sensor are provided in sizes less than the imaging effective focal plane of the wide-angle lens. The sensing angle of the infrared receiving sensor is greater than or equal to the transmitting angle of the infrared transmitting tube.

The above application expands a beam transmitted from the infrared transmitting tube by means of the wide-angle lens. The expanded beam forms a reflected wave after meeting an obstacle. The reflected wave is detected by the infrared receiving sensor after passing through the wide-angle lens, achieving the objective of large-area non-contact anti-collision.

BRIEF SUMMARY

Technical Problem

The above solution can reduce the number of depth cameras and the production cost of the entire robot. However, for quadruped robots, it is very important to sense the terrain under the robot abdomen and obstacles around the robot at any moment, so as to help the robot to select footholds for feet to prevent the feet from slipping or stepping into pits or holes, or to prevent the feet from hitting obstacles while swinging or prevent the robot from hitting obstacles around the robot during movement. However, the sensor and wide-angle lens of the above solution (Publication No. CN106526613A) are mounted at the front end of the robot body and can only carry out effective detection in the front of the walking robot, without the capability of sensing the terrain under the robot abdomen and obstacles around the robot at any moment, and resulting in a visual blind area, Therefore, the above solution cannot satisfy the requirements for autonomous movement and obstacle avoidance of quadruped robots.

Solution of the Problem

Technical Solution

In view of the defect in the prior art, the present invention aims at providing a quadruped robot having an ultra-wide viewing angle. The quadruped robot is equipped with a wide-angle lens or a fisheye lens having a viewing angle that covers a blind area under the robot abdomen, and thus is capable of sensing the terrain under the robot abdomen and obstacles around the robot, satisfying the requirements for autonomous movement and obstacle avoidance of quadruped robots.

In order to achieve the above objective, the technical solution of the present invention is as follows:

A quadruped robot having an ultra-wide viewing angle includes a robot body having an accommodating cavity, a head and a tail disposed at the ends of the robot body, and legs mounted on the robot body.

The legs and a space under the robot body form a blind area between the robot abdomen and the ground.

One or two or all of the robot body, the head, the tail, the legs are equipped with a wide-angle lens or a fisheye lens capable of acquiring ground information or/and information of obstacles around the robot.

The wide-angle lens or the fisheye lens is mounted to face downward or is mounted to tilt downward, so that the sight thereof can cover the blind area between the robot abdomen and the ground.

The quadruped robot of the present invention is equipped with the wide-angle lens or the fisheye lens having a viewing angle that covers the blind area under the robot abdomen, and thus is capable of sensing the terrain under the robot abdomen and obstacles around the robot, achieving ultra-wide vision, and effectively reducing visual blind areas of the quadruped robot. Therefore, the solution can help the robot to select footholds for feet to prevent the feet from slipping or stepping into pits or holes, or can be used for preventing the feet from hitting obstacles while swinging or for preventing the robot from hitting obstacles around the robot during movement. Thus, the solution prevents loss of control and damage of the quadruped robot, improves the motion sensing capability, and effectively satisfies the requirements for autonomous movement and obstacle avoidance of quadruped robots.

Furthermore, the present invention can satisfy the basic requirements for terrain detection and 360-degree surrounding obstacle avoidance just by providing a set of wide-angle or fisheye lenses having a downward viewing angle on the robot body, the head, or the tail. A small number of wide-angle or fisheye lenses are mounted, requiring a small number of mounting positions, and thus leading to a more compact overall size. The manufacturing cost of the entire robot and the difficulty in designing the overall structure of the robot body are both reduced.

In a preferred technical solution:

An apex of the wide-angle lens or the fisheye lens protrudes from a mounting surface therefor, and a viewing angle of same ranges from 130 degrees to 300 degrees, thus effectively sensing the terrain under the robot abdomen and obstacles around the robot. The sight of the lens can reach the blind area under the robot, that is, the lens can sense the terrain under the robot abdomen. The solution is simple, practical, and feasible.

In a preferred technical solution:

On the mounting surface, at least one protrusion for protecting the wide-angle lens or the fisheye lens is mounted around and close to the lens, so as to avoid abrasion or damage of the lens.

In a preferred technical solution:

A protrusion height of the protrusion is greater than a protrusion height of the wide-angle lens or the fisheye lens. The solution is simple and practical.

In a preferred technical solution:

The protrusion is one or more sets of rod or sheet structures, which reduce shielding on the wide-angle lens or the fisheye lens, minimizing the impact on the wide-angle lens or the fisheye lens while protecting the lens.

In a preferred technical solution:

The wide-angle lens or the fisheye lens is a dual- or multi-eye vision fisheye depth camera, a structured light depth camera, or a TOF depth camera, a viewing angle of which is a hemispherical viewing angle.

A person skilled in the art could make choices according to actual situations.

In the preferred solution adopting the depth camera, an image parallax of the dual- or multi-eye depth camera is processed by a CPU to obtain depth information. When the depth camera looks down horizontally, the current terrain and surrounding obstacles can be seen; when the depth camera looks up horizontally, a current ceiling and surrounding obstacles or pedestrians can be seen; and when the depth camera is disposed to face forward or backward, obstacles or pedestrians in front of or behind the quadruped robot can be seen.

In a preferred technical solution:

One or all of the robot body, the head, and the tail are equipped with a mounting hole for mounting the wide-angle lens or the fisheye lens. The lens is embedded in the mounting hole to facilitate fixation of the lens and to reduce a contact area between the lens and the outside, so that the lens can be effectively protected.

In a preferred technical solution:

A hole in communication with the accommodating cavity of the robot body is provided in or around the mounting hole, so as to facilitate wiring and achieve a simple and practical structure.

In a preferred technical solution:

A plurality of wide-angle lenses or the fisheye lenses are provided.

Four legs are provided and mounted around the robot body. The solution is simple and feasible.

In a preferred technical solution:

An upper end surface of the robot body is equipped with the fisheye lens facing upward.

A front end surface of the head is equipped with the fisheye lens facing forward.

A rear end surface of the tail is equipped with the fisheye lens facing backward.

The above solution can sense the surrounding environment of the quadruped robot in a three-dimensional, staggered manner and can sense the terrain under the robot abdomen and obstacles around the robot at any moment. Thus, the solution satisfies the requirements for autonomous movement and obstacle avoidance of quadruped robots, prevents loss of control and damage of the quadruped robot, and improves the motion sensing capability.

Beneficial Effects of the Invention

Beneficial Effects

The quadruped robot of the present invention is equipped with the wide-angle lens or the fisheye lens having a viewing angle that covers the blind area under the robot abdomen, and thus is capable of sensing the terrain under the robot abdomen and obstacles around the robot, achieving ultra-wide vision, and effectively reducing visual blind areas of the quadruped robot. Therefore, the solution can help the robot to select footholds for feet to prevent the feet from slipping or stepping into pits or holes, or can be used for preventing the feet from hitting obstacles while swinging or for preventing the robot from hitting obstacles around the robot during movement. Thus, the solution prevents loss of control and damage of the quadruped robot, improves the motion sensing capability, and effectively satisfies the requirements for autonomous movement and obstacle avoidance of quadruped robots.

Furthermore, the present invention can satisfy the basic requirements for terrain detection and 360-degree surrounding obstacle avoidance just by providing a set of wide-angle or fisheye lenses having a downward viewing angle on the robot body, the head, or the tail. A small number of wide-angle or fisheye lenses are mounted, requiring a small number of mounting positions, and thus leading to a more compact overall size. The manufacturing cost of the entire robot and the difficulty in designing the overall structure of the robot body are both reduced.

BRIEF DESCRIPTION OF THE DRAWINGS

Description of the Drawings

Figure 1:
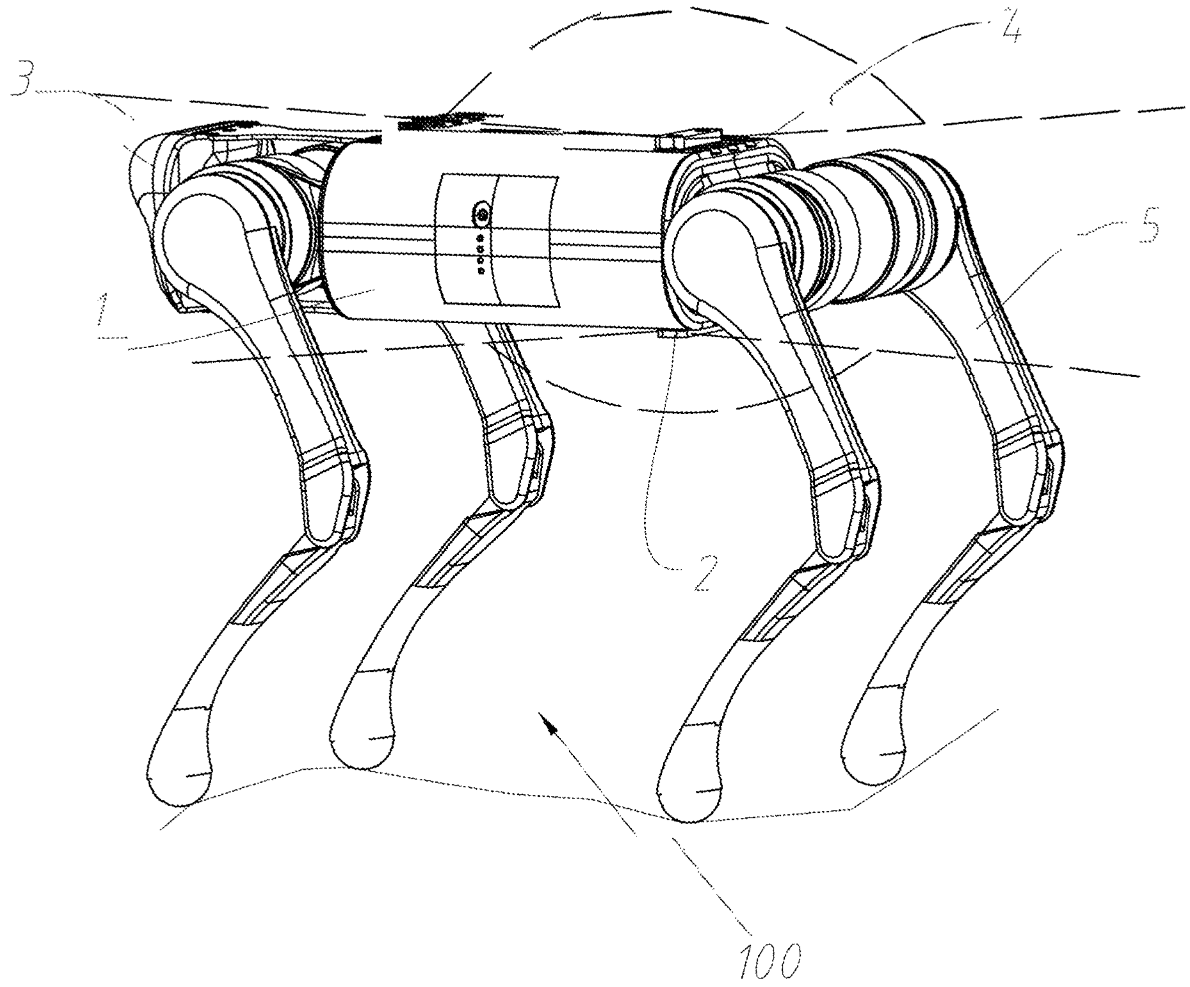

FIG. 1 is a schematic diagram of a preferred structure of the present invention.

Figure 2:
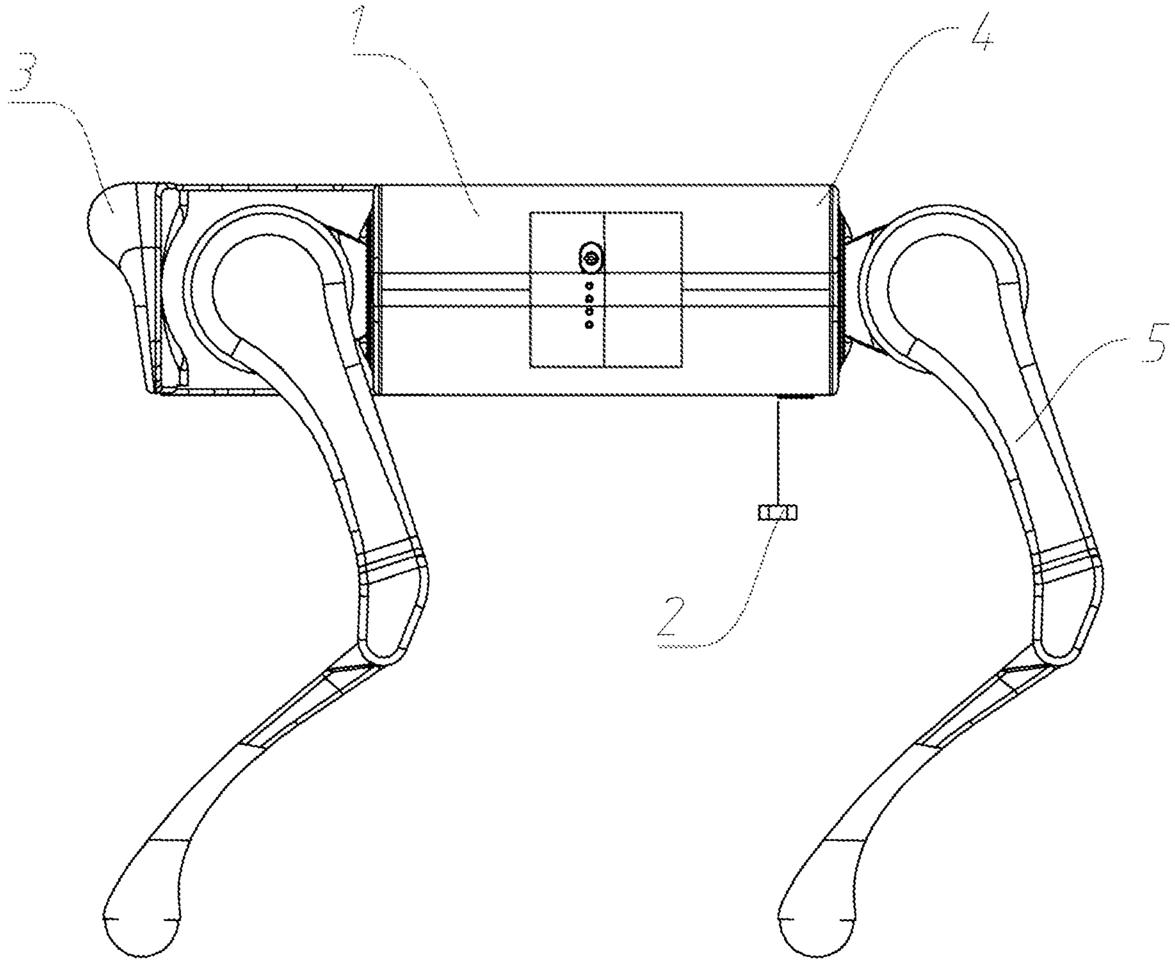

FIG. 2 is a schematic diagram of the structure shown in FIG. 1 viewed from another angle.

Figure 3:
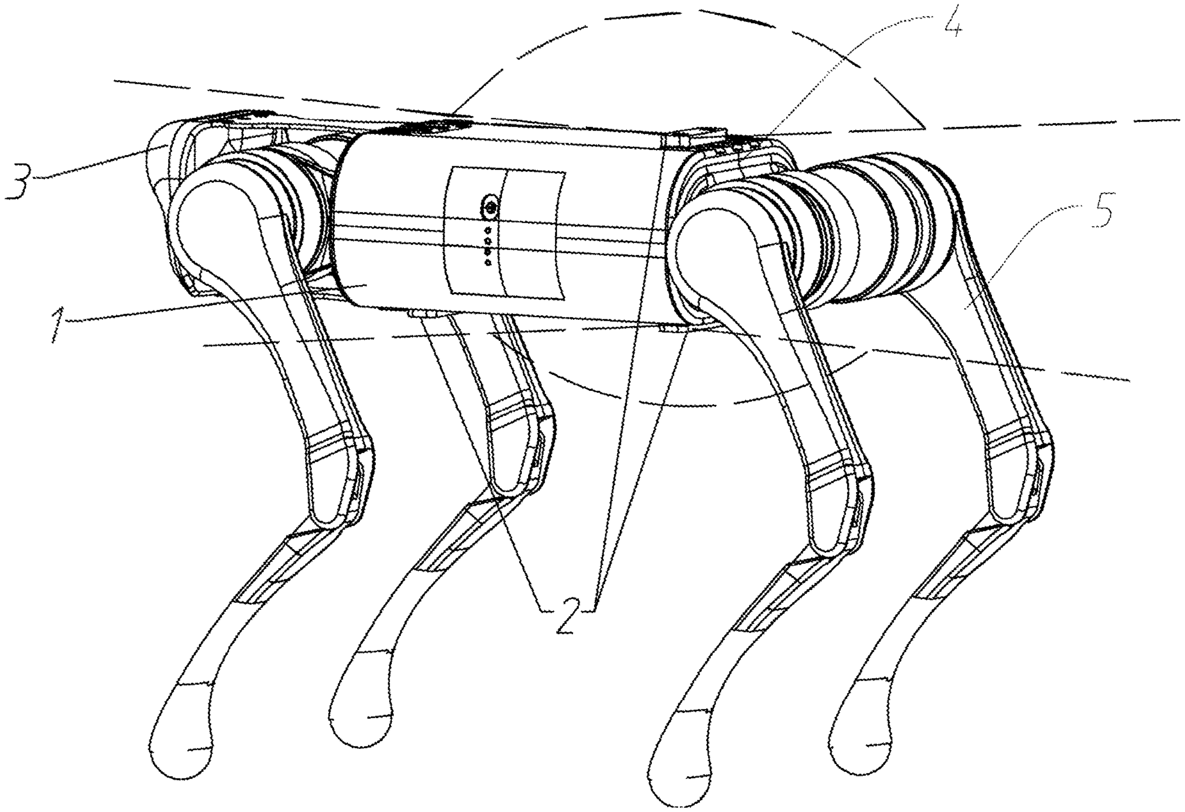

FIG. 3 is a schematic diagram of an optimal structure of the present invention.

Figure 4:
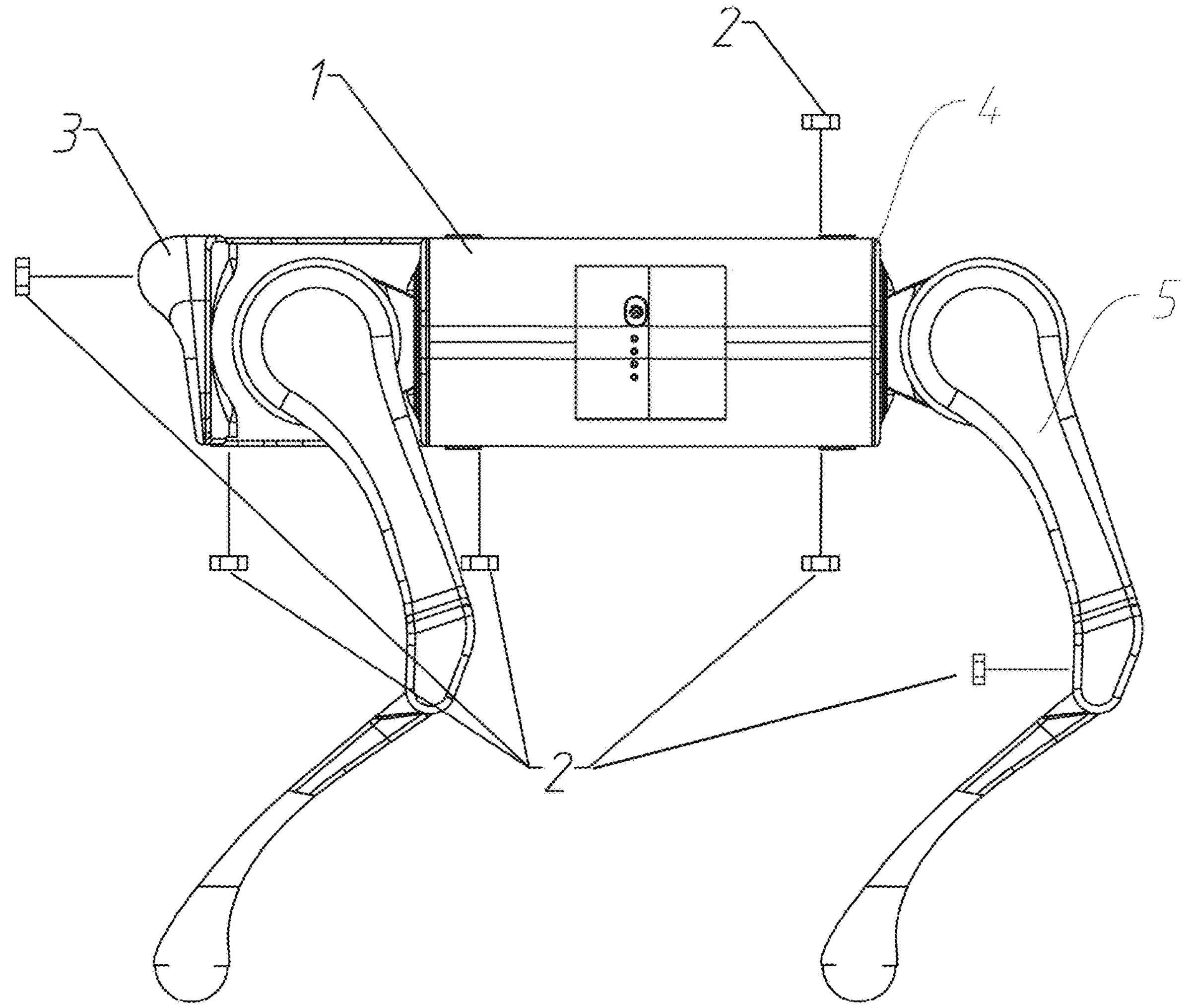

FIG. 4 is a schematic diagram of the structure shown in FIG. 3 viewed from another angle.

Figure 5:
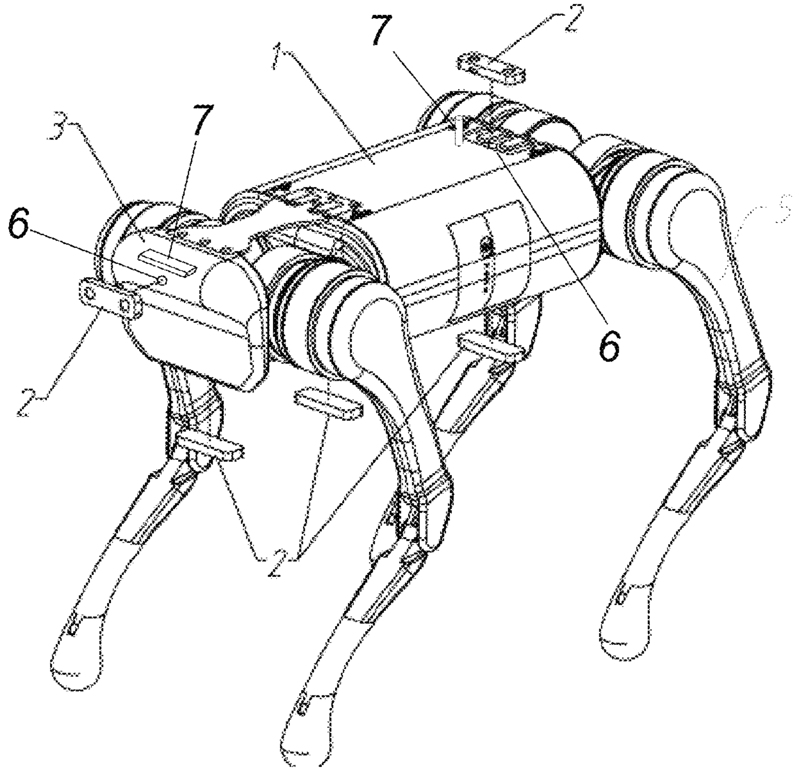

FIG. 5 is a schematic diagram of the structure shown in FIG. 4 viewed from yet another angle.

DESCRIPTION OF THE REFERENCE SIGNS

1. Robot body; 2. fisheye lens; 3. head; 4. tail; 5. leg; 100. blind area under the abdomen

DETAILED DESCRIPTION OF THE INVENTION

Embodiments of the Present Invention

In order to make the objective, technical solution, and advantages of the present invention clearer, the present invention is described in detail below with reference to the drawings and embodiments. It should be understood that the specific embodiments described herein are only intended to explain the present invention but are not for limiting the present invention.

On the contrary, the present invention covers any substitution, modification, equivalent method and solution made within the essence and scope of the present invention and defined by the claims. Further, in order to enable the public to have a better understanding of the present invention, some specific details are described in the following detailed description of the present invention. A person skilled in the art can still fully understand the present invention without the description of these details.

It should be noted that when two components are "fixedly connected" to each other, the two components can be directly connected to each other or can be connected via an intermediate component. On the contrary, when a component is defined to be "directly on" another component, there is no intermediate component. The terms "up", "down", "front", "rear" and similar expressions used herein are only intended for description.

As shown in FIGS. 1-2, a quadruped robot having an ultra-wide viewing angle includes a robot body 1 having an accommodating cavity, a head 3 and a tail 4 disposed at the ends of the robot body 1, and legs 5 mounted on the robot body 1. Four legs 5 are provided and mounted around the robot body 1.

The legs 5 and a space under the robot body 1 form a blind area 100 under the robot abdomen.

One or two or all of the robot body 1, the head 3, the tail 4, the legs 5 are equipped with a wide-angle lens and/or a fisheye lens 2 capable of acquiring ground information or/and information of obstacles around the robot.

The wide-angle lens and/or the fisheye lens 2 are mounted to face downward or mounted to tilt downward or substantially look down, so that the sight thereof can cover the blind area 100 under the robot abdomen.

The quadruped robot of the present invention is equipped with the wide-angle lens and/or the fisheye lens 2 having a viewing angle that covers the blind area 100 under the robot abdomen, and thus is capable of sensing the terrain under the robot abdomen and obstacles around the robot. Therefore, the solution can help the robot to select footholds for feet to prevent the feet from slipping or stepping into pits or holes, or can be used for preventing the feet from hitting obstacles while swinging or for preventing the robot from hitting obstacles around the robot during movement. Thus, the solution prevents loss of control and damage of the quadruped robot, improves the motion sensing capability, and effectively satisfies the requirements for autonomous movement and obstacle avoidance of quadruped robots.

Furthermore, by adopting the wide-angle lens and/or the fisheye lens 2, the present invention can effectively reduce the number of depth cameras, making the structure of the quadruped robot more compact. The manufacturing cost of the entire robot and the difficulty in designing the overall structure of the robot body 1 are both reduced.

Embodiment of the viewing angle range of the lens of the present invention:

An apex of the wide-angle lens and/or the fisheye lens 2 protrudes from a mounting surface therefor, and a viewing angle of same ranges from 130 degrees to 300 degrees, thus effectively sensing the terrain under the robot abdomen and obstacles around the robot.

Specific embodiment of adding a lens protection structure of the present invention:

On the mounting surface, at least one protrusion 7 for protecting the wide-angle lens and/or the fisheye lens 2 is mounted around and close to the lens, so as to avoid abrasion or damage of the lens.

A protrusion height of the protrusion 7 is greater than a protrusion height of the wide-angle lens and/or the fisheye lens 2. The solution is simple and practical.

The protrusion 7 is one or more sets of rod or sheet structures, which reduce shielding on the wide-angle lens and/or the fisheye lens 2, minimizing the impact on the wide-angle lens and/or the fisheye lens 2 while protecting the lens.

Specific embodiment of the structure of the fisheye lens 2 of the present invention:

The fisheye lens 2 is a dual- or multi-eye vision fisheye depth camera, a structured light depth camera, or a TOF depth camera, a viewing angle of which is a hemispherical viewing angle. A person skilled in the art could make choices according to actual situations.

Specific embodiment of providing a mounting hole of the present invention:

One or all of the robot body 1, the head 3, and the tail 4 are equipped with a mounting hole 6 for mounting the wide-angle lens and/or the fisheye lens 2 (FIG. 5). The lens is embedded in the mounting hole 6 to facilitate fixation of the lens and to reduce a contact area between the lens and the outside, so that the lens can be effectively protected.

A hole in communication with the accommodating cavity of the robot body 1 is provided in or around the mounting hole, so as to facilitate wiring and achieve a simple and practical structure.

FIGS. 3-5 show an optimal embodiment of the present invention:

A plurality of wide-angle lenses and/or the fisheye lenses 2 are provided.

An upper end surface of the robot body 1 is equipped with the wide-angle lenses and/or the fisheye lenses 2 facing upward.

A front end surface of the head 3 is equipped with the wide-angle lenses and/or the fisheye lenses 2 facing forward.

A rear end surface of the tail is equipped with the wide-angle lenses and/or the fisheye lenses 2 facing backward.

The above solution can sense the surrounding environment of the quadruped robot in a three-dimensional, staggered manner and can sense the terrain under the robot abdomen and obstacles around the robot at any moment. Thus, the solution satisfies the requirements for autonomous movement and obstacle avoidance of quadruped robots, prevents loss of control and damage of the quadruped robot, and improves the motion sensing capability.

A specific embodiment of a mounting relationship between the robot body 1, the head 3, and the tail 4 of the present invention:

One of the head 3 and the tail 4 is integrally formed with the robot body 1, and the other one is screwed to the robot body 1 via a connector.

In the present application, a fixed connection manner may be a screw or welding or riveting or inserting connection or a connection achieved via a third component. A person skilled in the art could make choices according to the actual situations.

Only preferred embodiments of the present invention are described above but are not intended for limiting the present invention. Any modification, equivalent replacement, and improvement made within the spirit and principles of the present invention shall fall within the scope of protection of the present invention.

What is claimed is:

1. A quadruped robot having an ultra-wide viewing angle, the quadruped robot comprising:

a robot body having a lower surface facing the ground and having a plurality of first wide-angle lenses, fisheye lenses or a combination thereof, an upper surface being opposite from the lower surface and having at least one second wide-angle lens or fisheye lens, and a plurality of accommodating cavities each accommodating one of the first and second wide-angle lenses and fisheye lenses, a head disposed at a first end of the robot body;

a tail disposed at a second end of the robot body; and legs mounted on the robot body;

wherein:

the legs and a space under the robot body form a blind area between a robot abdomen and the ground;

one or two or all of the head, the tail, the legs are also equipped with a third wide-angle lens or a fisheye lens;

each of the first, second and third wide-angle lenses or the fisheye lenses is mounted to face a direction perpendicular to a mounting surface thereof or is mounted to tilt from the direction perpendicular to the mounting surface thereof, so that sight thereof can cover the blind area between the robot abdomen and the ground; and the first wide-angle lenses or the fisheye lenses disposed on the robot body are arranged in a direction from the first end to the second end of the robot body.

2. The quadruped robot having an ultra-wide viewing angle according to claim 1, wherein an apex of each of the wide-angle lenses or the fisheye lenses protrudes from a mounting surface therefor, and a viewing angle of same ranges from 130 degrees to 300 degrees.

3. The quadruped robot having an ultra-wide viewing angle according to claim 2, wherein:

each of the wide-angle lenses or the fisheye lenses is a dual- or multi-eye vision fisheye depth camera, a structured light depth camera, or a TOF depth camera, a viewing angle of which is a hemispherical viewing angle.

4. The quadruped robot having an ultra-wide viewing angle according to claim 3, wherein one or all of the robot body, the head, and the tail are equipped with a mounting hole for mounting the wide-angle lens or the fisheye lens.

5. The quadruped robot having an ultra-wide viewing angle according to claim 2, wherein on the mounting surface, at least one protrusion for protecting at least one of the wide-angle lenses or the fisheye lenses is mounted around and close to the lens.

6. The quadruped robot having an ultra-wide viewing angle according to claim 5, wherein:

each of the wide-angle lenses or the fisheye lenses is a dual- or multi-eye vision fisheye depth camera, a structured light depth camera, or a TOF depth camera, a viewing angle of which is a hemispherical viewing angle.

7. The quadruped robot having an ultra-wide viewing angle according to claim 6, wherein one or all of the robot body, the head, and the tail are equipped with a mounting hole for mounting the wide-angle lens or the fisheye lens.

8. The quadruped robot having an ultra-wide viewing angle according to claim 5, wherein a protrusion height of the protrusion is greater than a protrusion height of the at least one of the wide-angle lenses or the fisheye lenses.

9. The quadruped robot having an ultra-wide viewing angle according to claim 8, wherein:

each of the wide-angle lenses or the fisheye lenses is a dual- or multi-eye vision fisheye depth camera, a structured light depth camera, or a TOF depth camera, a viewing angle of which is a hemispherical viewing angle.

10. The quadruped robot having an ultra-wide viewing angle according to claim 9, wherein one or all of the robot body, the head, and the tail are equipped with a mounting hole for mounting the wide-angle lens or the fisheye lens.

11. The quadruped robot having an ultra-wide viewing angle according to claim 8, wherein the protrusion is one or more sets of rod or sheet structures.

12. The quadruped robot having an ultra-wide viewing angle according to claim 11, wherein:

each of the wide-angle lenses or the fisheye lenses is a dual- or multi-eye vision fisheye depth camera, a structured light depth camera, or a TOF depth camera, a viewing angle of which is a hemispherical viewing angle.

13. The quadruped robot having an ultra-wide viewing angle according to claim 12, wherein one or all of the robot body, the head, and the tail are equipped with a mounting hole for mounting the wide-angle lens or the fisheye lens.

14. The quadruped robot having an ultra-wide viewing angle according to claim 1, wherein:

each of the wide-angle lenses or the fisheye lenses is a dual- or multi-eye vision fisheye depth camera, a structured light depth camera, or a TOF depth camera, a viewing angle of which is a hemispherical viewing angle.

15. The quadruped robot having an ultra-wide viewing angle according to claim 14, wherein one or all of the robot body, the head, and the tail are equipped with a mounting hole for mounting the wide-angle lens or the fisheye lens.

16. The quadruped robot having an ultra-wide viewing angle according to claim 15, wherein a hole in communication with the accommodating cavity of the robot body is provided in or around the mounting hole.

17. The quadruped robot having an ultra-wide viewing angle according to claim 16, wherein four legs are provided and mounted around the robot body.

18. The quadruped robot having an ultra-wide viewing angle according to claim 17, wherein:

a front end surface of the head is equipped with the fisheye lens facing forward; and a rear end surface of the tail is equipped with the fisheye lens facing backward.

* * * * *